United States Patent
Fazeli et al.

(10) Patent No.: US 11,498,666 B2
(45) Date of Patent: Nov. 15, 2022

(54) SHOCK STRUT ASSEMBLIES FOR LANDING GEAR

(71) Applicant: Goodrich Corporation, Charlotte, NC (US)

(72) Inventors: Amir Fazeli, Mississauga (CA); Susanne M. Reber, Strongsville, OH (US)

(73) Assignee: Goodrich Corporation, Charlotte, NC (US)

( * ) Notice: Subject to any disclaimer, the term of this patent is extended or adjusted under 35 U.S.C. 154(b) by 57 days.

(21) Appl. No.: 17/124,266

(22) Filed: Dec. 16, 2020

(65) Prior Publication Data

US 2022/0185462 A1    Jun. 16, 2022

(51) Int. Cl.
*B64C 25/60* (2006.01)
*B64C 25/62* (2006.01)

(52) U.S. Cl.
CPC .............. *B64C 25/60* (2013.01); *B64C 25/62* (2013.01)

(58) Field of Classification Search
CPC .......... B64C 25/58; B64C 25/60; B64C 25/62
See application file for complete search history.

(56) References Cited

U.S. PATENT DOCUMENTS

| | | | | |
|---|---|---|---|---|
| 3,536,170 A | * | 10/1970 | Bell | F16F 9/48 188/281 |
| 3,652,040 A | * | 3/1972 | Hartel | B64C 25/60 177/141 |
| 4,007,894 A | * | 2/1977 | Hartel | B64C 25/60 244/104 FP |
| 4,537,374 A | * | 8/1985 | Barnoin | F16F 7/125 188/371 |
| 5,320,374 A | | 6/1994 | Farris et al. | |
| 5,494,302 A | | 2/1996 | Farris et al. | |
| 9,981,710 B2 | | 5/2018 | Muraoka | |
| 2005/0072638 A1 | | 4/2005 | Kim | |
| 2015/0203195 A1 | | 7/2015 | Vatovec et al. | |
| 2018/0312245 A1 | | 11/2018 | Klim et al. | |

FOREIGN PATENT DOCUMENTS

| | | |
|---|---|---|
| CN | 101780841 | 7/2013 |
| CN | 106763424 | 5/2017 |
| GB | 136813 | 12/1919 |

OTHER PUBLICATIONS

European Patent Office, European Search Report dated Jul. 11, 2022 in Application No. 21213121.3.

* cited by examiner

*Primary Examiner* — Tye William Abell
(74) *Attorney, Agent, or Firm* — Snell & Wilmer L.L.P.

(57) ABSTRACT

A shock strut assembly for a landing gear may comprise a strut cylinder, a strut piston configured to telescope relative to the strut cylinder, and a locking system. The locking system may be configured to restrict rotation of the strut piston relative to the strut cylinder in response to compression of the shock strut assembly.

15 Claims, 6 Drawing Sheets

SHOCK STRUT ASSEMBLIES FOR LANDING GEAR

FIELD

The present disclosure relates generally to the field of shock struts, and more specifically to shock strut assemblies having locking systems configured to restrict rotation of the strut piston relative to the strut cylinder.

BACKGROUND

Shock absorbing devices are used in a wide variety of vehicle suspension systems for controlling motion of a vehicle and its tires with respect to the ground and for reducing transmission of transient forces from the ground to the vehicle. Aircraft landing gear assemblies generally include shock absorbing struts. These shock struts typically include a strut piston and a strut cylinder. Torque links are installed between the strut cylinder and the landing gear axle to restrain rotation of the axle. The torque links reduce, or eliminate, the rotation of the strut piston relative the strut cylinder, thereby increasing the stability of the landing gear and decreasing the chances of landing gear shimmy. However, due to part tolerances some degree of axle rotation may still exist. Further, reducing a weight of the landing gear and torque link could provide an overall weight savings. However, reducing landing gear weight can lead to a reduction in the torsional stiffness of the landing gear, which could hamper the shimmy stability.

SUMMARY

A shock strut assembly is disclosed herein. In accordance with various embodiments, the shock strut assembly comprises a strut cylinder, a strut piston configured to telescope relative to the strut cylinder, and a lock tab configured to translate with the strut cylinder. The lock tab is biased toward an inner diameter surface of the strut cylinder. A groove formed in the inner diameter surface of the strut cylinder is configured to receive the lock tab.

In various embodiments, a first bearing may be coupled to the strut piston. The lock tab may be pivotably coupled to the first bearing. In various embodiments, a second bearing may be coupled to the strut cylinder. The strut piston may translate relative to the second bearing.

In various embodiments, the groove may be defined, at least partially, by a groove floor and a groove floor ramp extending from the groove floor to the inner diameter surface of the strut cylinder. The groove floor ramp may be oriented at an obtuse angle relative to the groove floor.

In various embodiments, the second bearing may be located between the groove floor ramp and a lower surface of the strut cylinder. The lower surface of the strut cylinder may extend between the inner diameter surface of the strut cylinder and an outer diameter surface of the strut cylinder.

In various embodiments, the lock tab may be located in a cavity defined by the first bearing. In various embodiments, a biasing member may be configured to bias the lock tab toward the inner diameter surface of the strut cylinder. In various embodiments, the biasing member may comprise at least one of a compression spring or a torsion spring.

A landing gear is also disclosed herein. In accordance with various embodiments, the landing gear may comprise an axle configured to support a tire, and a shock strut assembly coupled to the axle. The shock strut assembly may include a strut cylinder, a strut piston configured to telescope relative to the strut cylinder, and a lock tab configured to translate with the strut cylinder. The lock tab may be biased toward an inner diameter surface of the strut cylinder. A groove formed in the inner diameter surface of the strut cylinder may be configured to receive the lock tab.

In various embodiments, locating the lock tab in the groove may restrict rotation of the strut piston relative to the strut cylinder. In various embodiments, the shock strut assembly may further comprise a first bearing coupled to the strut piston.

In various embodiments, the lock tab may be pivotably coupled to the first bearing. In various embodiments, the shock strut assembly may further comprise a second bearing coupled to the strut cylinder and located between the first bearing and a lower surface of the strut cylinder. The lower surface of the strut cylinder defines a piston opening of the strut cylinder and is oriented toward the axle.

In various embodiments, a length of the groove may be configured such that the lock tab is located in the groove when the shock strut assembly is in a compressed position and outside the groove when the shock strut assembly is in a fully extended position.

In various embodiments, a length of the groove is configured such that the lock tab is located in the groove when the shock strut assembly is in a fully extended position.

In various embodiments, the shock strut assembly may further comprise a biasing member configured to bias the lock tab toward the inner diameter surface of the strut cylinder.

A shock strut assembly for a landing gear is also disclosed herein. In accordance with various embodiments, the shock strut assembly may comprise a strut cylinder, a strut piston configured to telescope relative to the strut cylinder, and a locking system configured to restrict rotation of the strut piston relative to the strut cylinder in response to compression of the shock strut assembly.

In various embodiments, the locking system may be configured to be in an unlocked state when a stroke length of the shock strut assembly is greater than a threshold stroke length, and in a locked state when the stroke length of the shock strut assembly is greater than or equal to the threshold stroke length.

In various embodiments, the locking system may comprise a lock tab configured to translate with the strut piston relative to the strut cylinder. In various embodiments, the lock tab may be biased toward an inner diameter surface of the strut piston.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Disclosed herein is a shock strut assembly for an aircraft landing gear. In accordance with various embodiments, the shock strut assembly includes a locking system operably coupled between the strut piston and the strut cylinder of the shock strut assembly. The locking system is configured to limit or eliminate strut piston rotation when the shock strut is in a compressed position. In accordance with various embodiments, the locking system includes one or more biased locking tabs configured to be received by one or more grooves formed in an inner diameter of the strut cylinder. In various embodiments, the locking tabs may be incorporated into an upper bearing of the shock strut assembly. The locking system is configured such that, in response to compression of the shock strut assembly, the locking tabs translate into the grooves. Locating the locking tabs in the grooves reduces or eliminates rotation of the strut piston relative to strut cylinder, thereby increasing a torsional stiffness of the landing gear and/or decreasing rotational freedom of the axle and wheels of the landing gear. Increasing the torsional stiffness and/or reducing the rotational freedom of the axle and wheels reduces or eliminates occurrences of landing gear "shimmy", wherein a degree of rotational freedom of the axle about an axis perpendicular to ground surface 11 in FIG. 1 may cause the landing gear to oscillate in a clockwise direction and a counterclockwise direction about the Y-axis on the XY axis of FIG. 2A.

Figure 1:
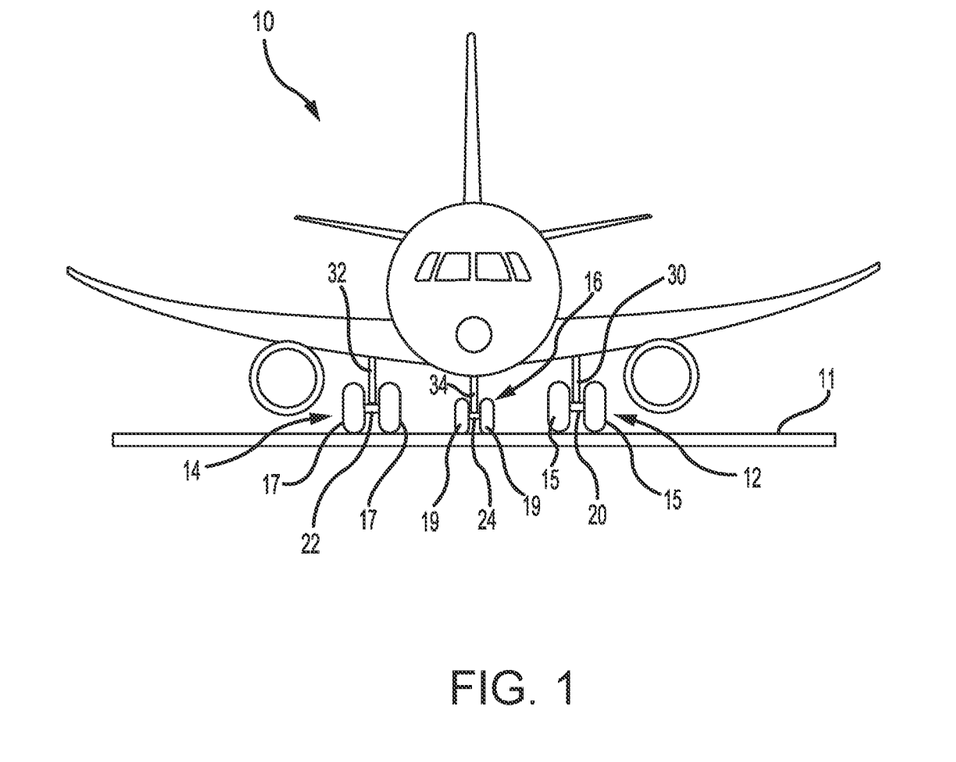
FIG. 1 illustrates an aircraft, in accordance with various embodiments.

With reference to FIG. 1, an aircraft 10 is illustrated. In accordance with various embodiments, aircraft 10 may include landing gear such as left (or first) landing gear 12, right (or second) landing gear 14, and nose (or third) landing gear 16. Left landing gear 12, right landing gear 14, and nose landing gear 16 may generally support aircraft 10 when aircraft 10 is not flying, allowing aircraft 10 to taxi, take off, and land without damage. Left landing gear 12 may include a shock strut assembly 30 and a pair of wheels 15 coupled by an axle 20. Right landing gear 14 may include a shock strut assembly 32 and a pair of wheels 17 coupled by an axle 22. Nose landing gear 16 may include a shock strut assembly 34 and a pair of nose wheels 19 coupled by an axle 24. In various embodiments, nose wheels 19 may differ from main wheels 15 and main wheel 17 in that the nose wheels 19 may not include a brake. While left landing gear 12, right landing gear 14, and nose landing gear 16 are illustrated as each having two wheels, it should be understood that the shock strut assemblies described herein may be used with landing gear having any number and/or configuration of wheels.

When supporting aircraft 10 on ground surface 11, the weight of aircraft 10 may cause shock strut assemblies 30, 32, and/or 34 to compress. In this regard, during landing and taxiing of aircraft 10, the shock strut assemblies compress, thereby decreasing a stroke length of the shock strut assembly and absorbing the kinetic energy of the aircraft.

Figure 2A:
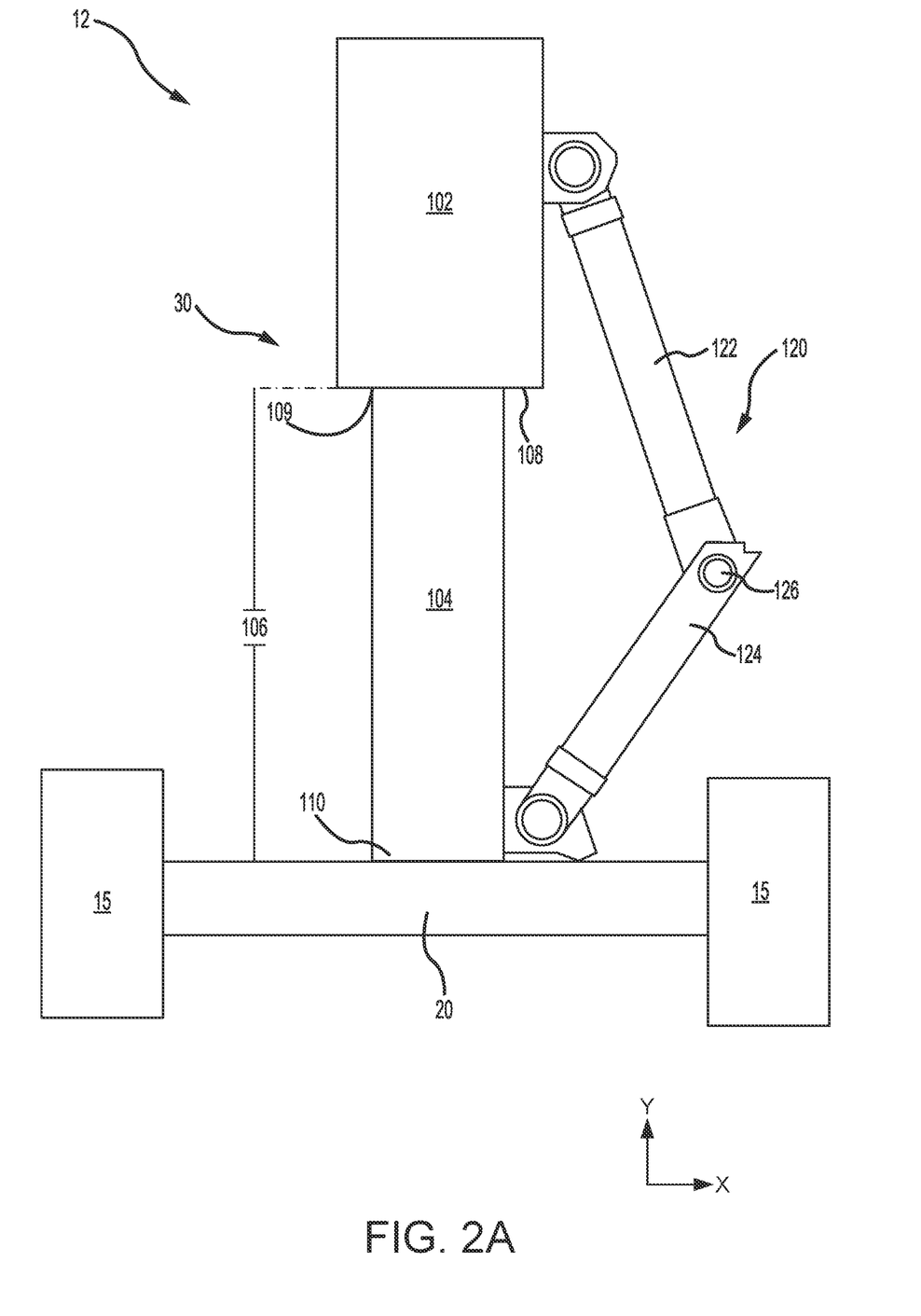
FIG. 2A illustrates a landing gear with the shock strut assembly in a fully extended position, in accordance with various embodiments.
Figure 2B:
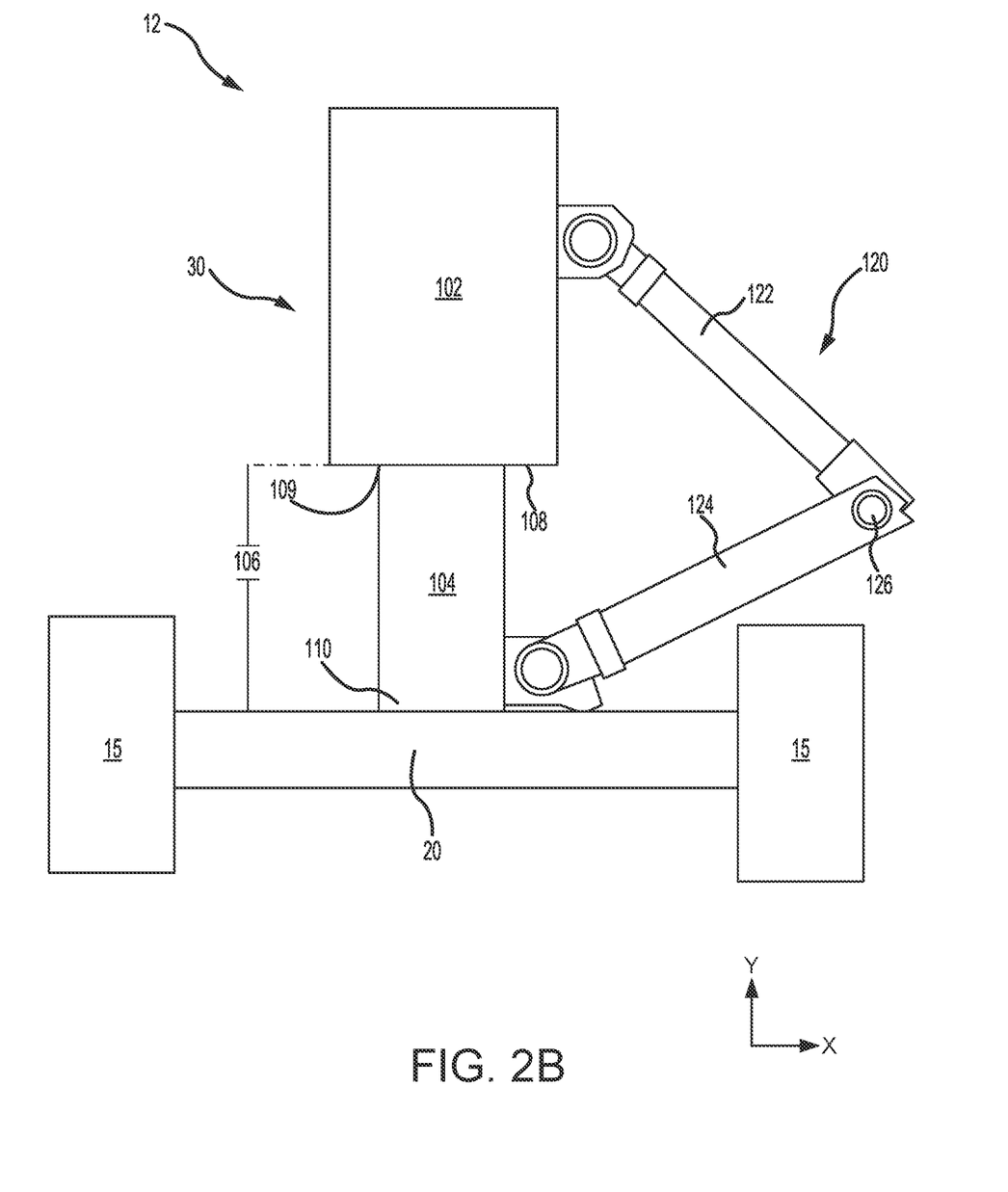
FIG. 2B illustrates a landing gear with the shock strut assembly a compressed position, in accordance with various embodiments.

With reference to FIGS. 2A and 2B, left landing gear 12 is illustrated with shock strut assembly 30 in a fully extended position and a compressed position, respectively. Shock strut assembly 30 may be in the fully extended (i.e., decompressed) position, when left landing gear 12 is in a landing gear down position and aircraft 10, with momentary reference to FIG. 1, is off the ground. For example, shock strut assembly 30 may be in the fully extended position just prior to wheels 15 touching down during landing and/or just after wheels 15 lose contact with the ground surface during take-off. Shock strut assembly 30 may be in the compressed position, when left landing gear 12 is supporting the weight of aircraft 10. In various embodiments, shock strut assembly 30 may also be in the compressed position, when left landing gear 12 is the landing gear up position. As used herein, the "landing gear up position" refers to when the landing hear is located within the wheel wells of the aircraft. While FIGS. 2A and 2B illustrate features of left landing gear 12 and shock strut assembly 30, it is contemplated and understood that right landing gear 14 and shock strut assembly 32 (FIG. 1) include the components and functionalities as described herein with reference to left landing gear 12 and shock strut assembly 30.

Shock strut assembly 30 may include a strut cylinder 102 and a strut piston 104. Axle 20 is coupled to an end 110 of strut piston 104 that is opposite strut cylinder 102. Strut piston 104 is telescopically coupled to strut cylinder 102. In this regard, strut piston 104 is configured to telescope relative to strut cylinder 102, thereby causing shock strut assembly 30 to absorb and damp loads imposed on left landing gear 12. Stated differently, strut piston 104 translates in and out strut cylinder 102. In various embodiments, fluid including hydraulic fluid, oil, and/or gas, such as nitrogen, may be located within an internal cavity of strut cylinder 102. The internal cavity of strut cylinder 102 may consist of a single cavity or separate cavities containing one or more different fluids within the cavities. Strut piston 104 translating relative to strut cylinder 102 may change the internal cavity pressure of strut cylinder 102 and/or may cause fluid to flow in and out shock strut assembly 30.

Strut piston 104 extends from strut cylinder 102 by a length 106. In accordance with various embodiments, as shock strut assembly 30 compresses (i.e., as strut piston 104 translates into strut cylinder 102), length 106 decreases. Conversely, as shock strut assembly 30 decompresses (i.e., as strut piston 104 translates out strut cylinder 102), length 106 increases. In various embodiments, length 106 corresponds to a distance between axle 20 and a lower surface 108 of strut cylinder 102. Lower surface 108 of strut cylinder 102 defines a piston opening 109, in strut cylinder 102, through which strut piston 104 translates.

In various embodiments, shock strut assembly 30 may include a torque link 120 coupled to the strut cylinder 102 and strut piston 104. In various embodiments, torque link 120 may be coupled to the strut cylinder 102 and axle 20. Torque link 120 includes an upper (or first) arm 122 and a lower (or second) arm 124. Upper arm 122 may be coupled to strut cylinder 102. Lower arm 124 may be coupled to strut piston 104 and/or to axle 20. Upper arm 122 is pivotably coupled to lower arm 124 via a pivot joint 126. Upper arm 122 and lower arm 124 may pivot relative to one another and about pivot joint 126. For example, upper arm 122 and lower arm 124 may pivot relative to one another and about pivot joint 126 in response to translation of strut piston in and out strut cylinder 102. Stated differently, pivot joint 126 is configured to allow upper arm 122 and lower arm 124 to rotate relative to one as strut piston 104 telescopes relative to (i.e., translates in and out) strut cylinder 102. In various embodiments, shock strut assembly 30 may be part of an articulated landing gear. In this regard, a torque link, similar to torque link 120, may be pivotably coupled between shock strut assembly 30 (e.g., strut cylinder 102) and aircraft 10 (with momentary reference to FIG. 1).

Torque link 120 provides torsion stiffness for left landing gear 12 and decreases rotation of strut piston 104 relative to strut cylinder 102. In this regard, torque link 120 reduces horizontal rotation or "shimmy" of axle 20. As used herein, "horizontal rotation" of axle 20 refers to rotation of axle 20 about the Y axis on the provided XY axes (i.e., rotation of axle 20 about an axis that is perpendicular to the axis of rotation of wheels 15 and parallel to the direction that strut piston 104 telescopes. As will be appreciated by those skilled in the art, it may be desirable to increase the torsional stiffness of the landing gear without increasing a weight of the shock strut assembly, as increased torsional stiffness reduces horizontal rotation of axle 20. It may also be desirable to decrease the weight of torque link 120 and/or eliminate torque link 120 while maintaining torsional stiffness for shimmy stability of the landing gear.

Figure 3A:
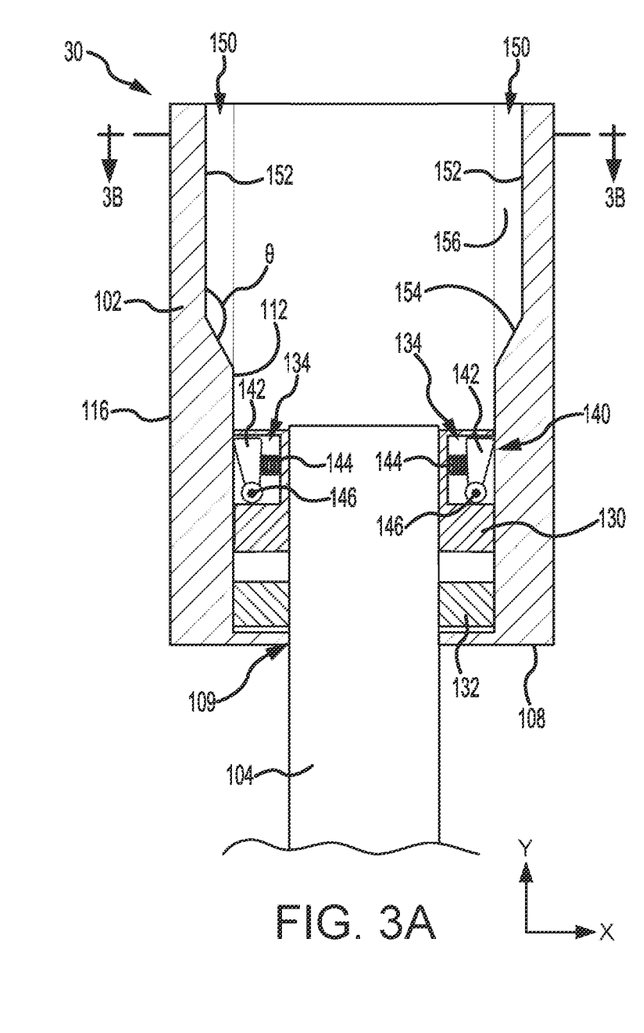
FIG. 3A illustrates a cross-section view of a shock strut assembly in the fully extended position with a locking system of the shock strut assembly in an unlocked state, in accordance with various embodiments.

Referring to FIG. 3A, a cross-sectional view of shock strut assembly 30 is illustrated. In FIG. 3A, shock strut assembly 30 in the fully extended (or decompressed) position. In various embodiments, shock strut assembly 30 may include an upper (or first) bearing 130 and a lower (or second) bearing 132. Upper bearing 130 may be coupled to strut piston 104 such that upper bearing 130 translates with strut piston 104 relative to strut cylinder 102. Lower bearing 132 is coupled to strut cylinder 102. Lower bearing 132 does not translate with strut piston 104. In this regard, strut piston 104 and upper bearing 130 translate relative to lower bearing 132. Lower bearing 132 may be located more proximate lower surface 108 of strut cylinder 102 as compared to upper bearing 130. Stated differently, lower bearing 132 may be located between upper bearing 130 and lower surface 108 of strut cylinder 102.

Figure 3B:
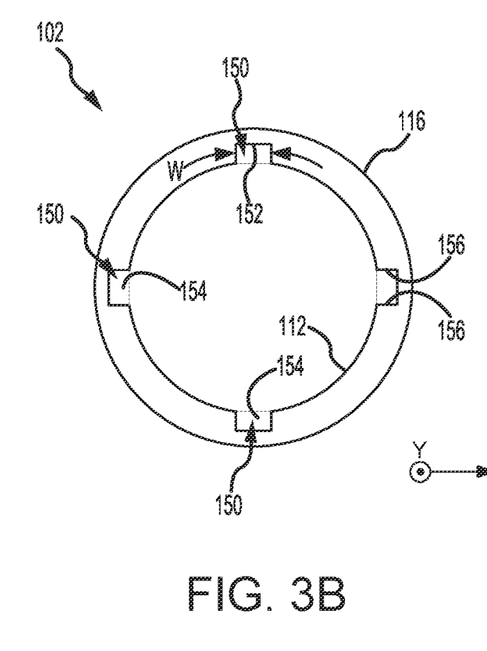
FIG. 3B illustrates a cross-section view of a shock strut assembly strut cylinder taken along the line 3B-3B in FIG. 3A, in accordance with various embodiments.

In accordance with various embodiments, shock strut assembly 30 includes a locking system 140. Locking system 140 is operably coupled between strut piston 104 and strut cylinder 102. Locking system 140 is configured to restrict or prevent rotation of strut piston 104 relative to strut cylinder 102. In accordance with various embodiments, locking system 140 includes one or more lock tabs 142 located about strut piston 104. Lock tabs 142 are configured to translate with strut piston 104 along an inner diameter surface 112 of strut cylinder 102. Inner diameter surface 112 is oriented radially inward, toward strut piston 104 and away from an outer diameter surface 116 of strut cylinder 102. Lower surface 108 of strut cylinder 102 may extend from outer diameter surface 116 to inner diameter surface 112. While FIGS. 3A and 3B illustrate features of shock strut assembly 30, it is contemplated and understood that the shock strut assembly 32 (FIG. 1) of the right landing gear 14 includes the components and functionalities as described herein with reference to shock strut assembly 30. In this regard, in various embodiments, each of shock strut assembly 30 and shock strut assembly 32 includes a locking system 140.

In various embodiments, lock tabs 142 may be coupled to upper bearing 130. In various embodiments, lock tabs 142 may be located in a lock cavity 134 defined by upper bearing 130. Each lock tab 142 is biased toward inner diameter surface 112 of strut cylinder 102. In various embodiments, locking system 140 includes one or more biasing member(s) 144 configured to apply a biasing load to each lock tab 142. Biasing member 144 is configured to bias (i.e., force) lock tab 142 toward inner diameter surface 112 of strut cylinder 102. Biasing member 144 may comprise a compression spring, a torsion spring, or any other member capable of biasing lock tab 142 toward inner diameter surface 112. In various embodiments, lock tabs 142 may rotate, via a pivot joint 146, relative to upper bearing 130 and strut piston 104. Stated differently, lock tab 142 is pivotably coupled to upper bearing 130 (or strut piston 104) via pivot joint 146.

In accordance with various embodiments, strut cylinder 102 defines one or more grooves 150 configured to receive lock tabs 142. With additional reference to FIG. 3B, a cross-section view of strut cylinder 102 is illustrated. Grooves 150 are formed in inner diameter surface 112 of strut cylinder 102. Grooves 150 are defined, at least partially, by a groove floor 152, a groove floor ramp 154, and groove sidewalls 156. In accordance with various embodiments, the diameter of strut cylinder 102 as measured at inner diameter surface 112 is less than the diameter of strut cylinder 102 as measured at groove floor 152. Groove floor ramp 154 extends circumferentially between groove sidewalls 156 and radially from groove floor 152 to inner diameter surface 112 of strut cylinder 102. Groove sidewalls 156 each extend radially from groove floor 152 to inner diameter surface 112 of strut cylinder 102.

Figure 3C:
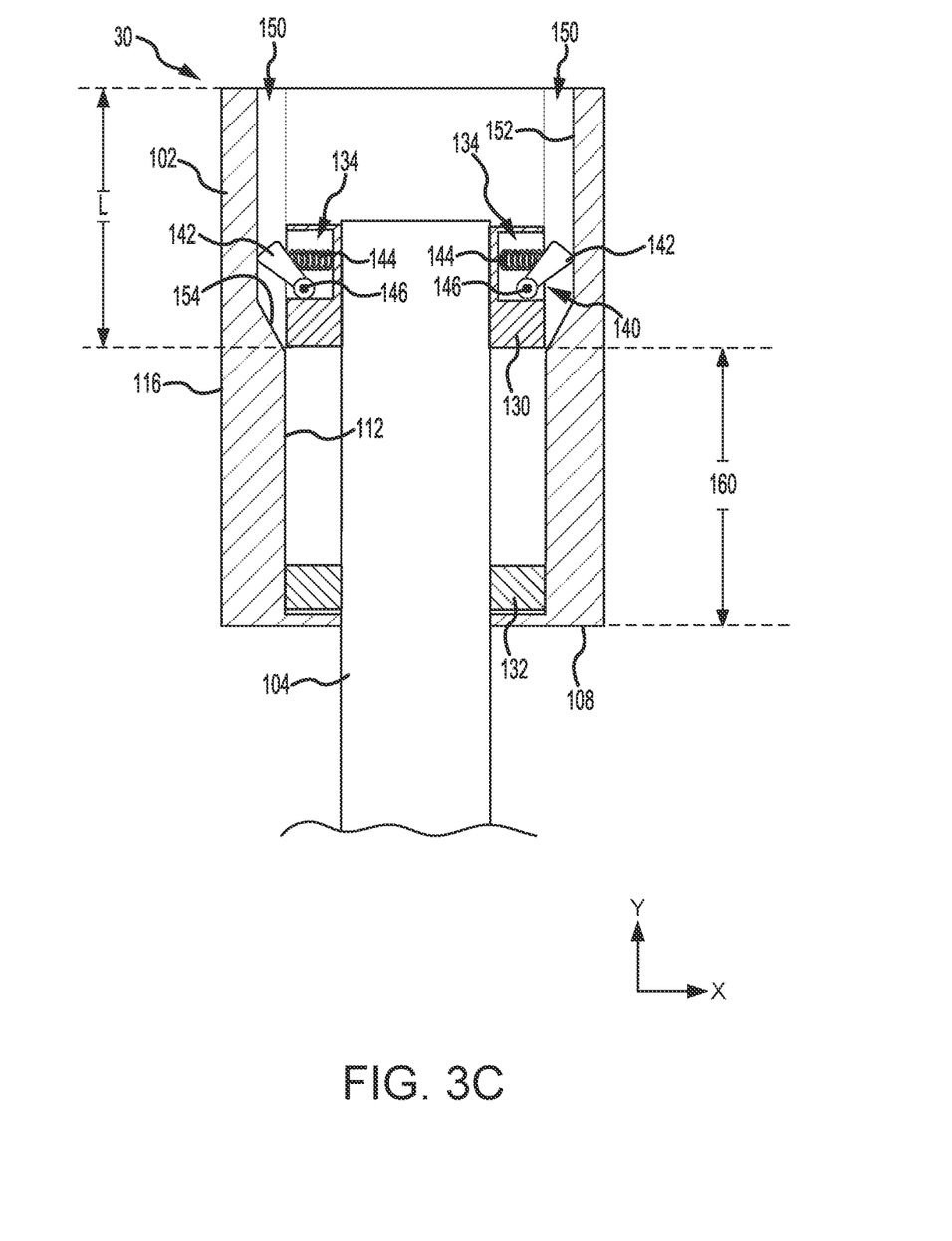
FIG. 3C illustrates a cross-section view of a shock strut assembly in the compressed position with a locking system of the shock strut assembly in a locked state, in accordance with various embodiments.

With additional reference to FIG. 3C, in accordance with various embodiments, as shock strut assembly 30 compresses, strut piston 104 translates into strut cylinder 102. As strut piston translates into strut cylinder 102, lock tabs translate along inner diameter surface 112 toward grooves 150 and away from lower bearing 132 and lower surface 108. As upper bearing 130 translates over grooves 150, the interference between inner diameter surface 112 and lock tabs 142 is removed, thereby allowing lock tabs 142 to rotate into grooves 150. Stated differently, biasing members 144 force lock tabs 142 into grooves 150, in response to the interference between inner diameter surface 112 and lock tabs 142 being removed.

In various embodiments, a length L of grooves 150 may be configured such that lock tabs 142 will be located in grooves 150 when shock strut assembly 30 is at a static stroke length. Stated differently, a distance 160 between groove floor ramp 154 and lower surface 108 of strut cylinder 102 is configured such that lock tabs 142 are located in grooves 150 when shock strut assembly 30 is at the static stroke length. Length L and distance 160 are measured in a direction parallel to the direction in which strut piston 104 translates (i.e., in a direction parallel to the Y-axis). In accordance with various embodiments, shock strut assembly 30 is at the static stroke length, when the landing gear is supporting the weight of the aircraft. For example, and with momentary reference to FIG. 1, shock strut assemblies 30, 32, 34 may be at their respective static stroke lengths when aircraft 10 is parked on ground surface 11.

In various embodiments, the length L of grooves 150 may be configured such that in response to shock strut assembly 30 decompressing from the static stroke length (FIG. 3C) to the fully extended position (FIG. 3A) lock tabs 142 translate out of grooves 150. Stated differently, in response to shock strut assembly 30 translating from a compressed position to the fully extended position, locking system 140 may translate from a locked state (FIG. 3C), wherein lock tabs 142 are located in grooves 150, to an unlocked state (FIG. 3A), wherein lock tabs 142 are located outside grooves 150. In various embodiments, locking system 140 may be in the unlocked state when a stroke length of shock strut assembly 30 is greater than a threshold stroke length, and locking system 140 may be in the locked state when the stroke length of the shock strut assembly 30 is less than or equal to the threshold stroke length. In this regard, shock strut assembly 30 translating beyond the threshold stroke length causes locking system 140 to translate from the locked state, wherein lock tabs 142 are located in grooves 150, to the unlocked state, wherein lock tabs 142 are located outside grooves 150.

In accordance with various embodiments, groove floor ramp 154 is orientated at an angle theta (θ) relative to groove floor 152. In various embodiments, angle θ may be an obtuse angle. For example, angle θ may be between 100° and 170°, between 115° and 155°, or between 125° and 145°. Orienting groove floor ramp 154 at an obtuse angle may facilitate rotation of lock tab 142 into lock cavity 134 and away from inner diameter surface 112 as shock piston translates from the compressed position, as shown in FIG. 3C, to the fully extended position of FIG. 3A. Stated differently, orienting groove floor ramp 154 at an obtuse angle may allow lock tab 142 to translate more smoothly out of groove 150, as compared to if groove floor ramp 154 were oriented at a 90° angle relative to groove floor 152.

In accordance with various embodiments, a circumferential width W (FIG. 3B) of grooves 150 is selected such that, when lock tabs 142 are located in grooves 150, rotation of strut piston 104 relative to strut cylinder 102 is restricted and/or prevented. The circumferential width W (FIG. 3B) of grooves 150 is measured between groove sidewalls 156. In this regard, when lock tabs 142 are located in grooves 150, a load path, which resists horizontal rotation of axle 20 (FIGS. 2A and 2B) and increases the torsional strength of left landing gear 12, is created via lock tabs 142 and strut cylinder 102.

Employing locking system 140 to restrict rotation of the shock piston and create a load path that resists horizontal rotation of the axle increases the torsional strength of the landing gear. In this regard, locking system 140 may improve shimmy performance of the landing gear and/or may allow for a weight of the torque link 120 to be decreased.

Figure 4:
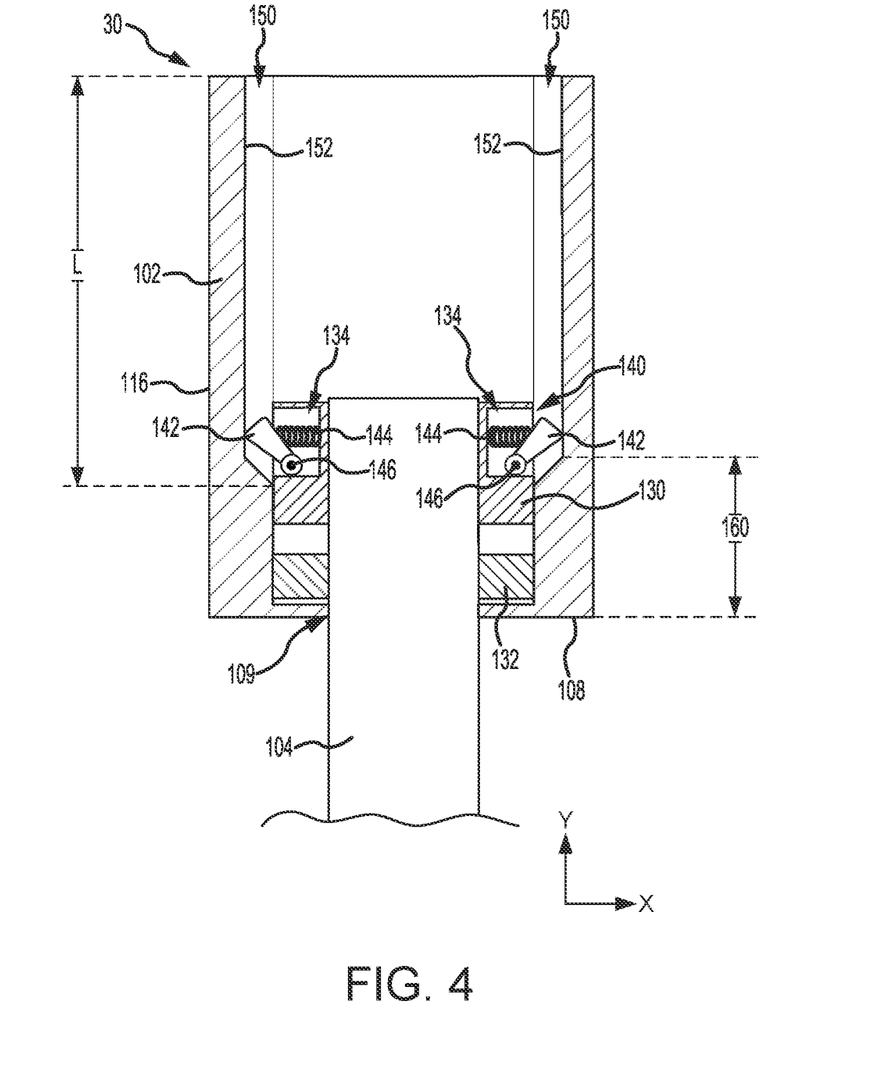
FIG. 4 illustrates a cross-section view of a shock strut assembly in the fully extended position with a locking assembly of the shock strut assembly in a locked state, in accordance with various embodiments.

With reference to FIG. 4, in various embodiments, the length L of grooves 150 may be selected such that lock tabs 142 are located in grooves 150 when shock strut assembly 30 is fully extended (i.e., decompressed). Stated differently, the distance 160 between groove floor ramp 154 and lower surface 108 of strut cylinder is configured such that lock tabs 142 are located in grooves 150 when shock strut assembly 30 is fully extended. Locating lock tabs 142 in grooves 150 restricts rotation of strut piston 104 relative to strut cylinder 102 and creates a load path that resists horizontal rotation of the axle for the entire stroke length of the shock strut assembly. Employing a locking system 140 that restricts rotation of strut piston 104 along the entire stroke length of the shock struct assembly may allow torque link 120 (FIG. 2A) to be eliminated from the landing gear.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A shock strut assembly, comprising:
a strut cylinder;
a strut piston configured to telescope relative to the strut cylinder; and
a lock tab configured to translate with the strut cylinder, the lock tab being biased toward an inner diameter surface of the strut cylinder, wherein a groove formed in the inner diameter surface of the strut cylinder is configured to receive the lock tab, wherein a length of the groove is configured such that the lock tab is located in the groove when the shock strut assembly is in a compressed position and outside the groove when the shock strut assembly is in a fully extended position.

2. The shock strut assembly of claim 1, further comprising a biasing member configured to bias the lock tab toward the inner diameter surface.

3. The shock strut assembly of claim 2, wherein the biasing member comprises at least one of a compression spring or a torsion spring.

4. The shock strut assembly of claim 1, further comprising a first bearing coupled to the strut piston, wherein the lock tab is pivotably coupled to the first bearing.

5. The shock strut assembly of claim 4, wherein the lock tab is located in a cavity defined by the first bearing.

6. The shock strut assembly of claim 4, further including a second bearing coupled to the strut cylinder, wherein the strut piston translates relative to the second bearing.

7. The shock strut assembly of claim 6, wherein the groove is defined, at least partially, by a groove floor and a groove floor ramp extending from the groove floor to the inner diameter surface of the strut cylinder, wherein the groove floor ramp is oriented at an obtuse angle relative to the groove floor.

8. The shock strut assembly of claim 7, wherein the second bearing is located between the groove floor ramp and a lower surface of the strut cylinder, and wherein the lower surface of the strut cylinder extends between the inner diameter surface of the strut cylinder and an outer diameter surface of the strut cylinder.

9. A landing gear, comprising:
an axle configured to support a tire; and
a shock strut assembly coupled to the axle, the shock strut assembly including:
a strut cylinder;
a strut piston configured to telescope relative to the strut cylinder; and
a lock tab configured to translate with the strut cylinder, wherein the lock tab is biased toward an inner diameter surface of the strut cylinder, and wherein a groove formed in the inner diameter surface of the strut cylinder is configured to receive the lock tab, wherein a length of the groove is configured such that the lock tab is located in the groove when the shock strut assembly is in a compressed position and outside the groove when the shock strut assembly is in a fully extended position.

10. The landing gear of claim 9, wherein the shock strut assembly further comprises a biasing member configured to bias the lock tab toward the inner diameter surface of the strut cylinder.

11. The landing gear of claim 9, wherein locating the lock tab in the groove restricts rotation of the strut piston relative to the strut cylinder.

12. The landing gear of claim 11, wherein the shock strut assembly further comprises a first bearing coupled to the strut piston.

13. The landing gear of claim 12, wherein the lock tab is pivotably coupled to the first bearing.

14. The landing gear of claim 13, wherein the shock strut assembly further comprises a second bearing coupled to the strut cylinder and located between the first bearing and a lower surface of the strut cylinder, and wherein the lower surface of the strut cylinder defines a piston opening of the strut cylinder and is oriented toward the axle.

15. A shock strut assembly for a landing gear, comprising:
a strut cylinder;
a strut piston configured to telescope relative to the strut cylinder; and
a locking system comprising a lock tab configured to translate with the strut cylinder, wherein the lock tab is biased toward an inner diameter surface of the strut cylinder, and wherein a groove formed in an inner diameter surface of the strut cylinder is configured to receive the lock tab;
the locking system configured to restrict rotation of the strut piston relative to the strut cylinder in response to compression of the shock strut assembly, wherein the locking system is configured to be in an unlocked state when a stroke length of the shock strut assembly is greater than a threshold stroke length, and
wherein the locking system is configured to be in a locked state when the stroke length of the shock strut assembly is less than or equal to the threshold stroke length.

* * * * *